(12) United States Patent
Shah

(10) Patent No.: US 6,787,086 B2
(45) Date of Patent: Sep. 7, 2004

(54) PROCESS FOR MAKING GLASS-REINFORCED MULTI-LAYER SHEETS FROM OLEFIN POLYMER MATERIALS

(76) Inventor: Bakhtiar Alam Shah, 36 Long Dr., Elkton, MD (US) 21921

(*) Notice: Subject to any disclaimer, the term of this patent is extended or adjusted under 35 U.S.C. 154(b) by 0 days.

(21) Appl. No.: 10/607,662

(22) Filed: Jun. 27, 2003

(65) Prior Publication Data

US 2004/0091700 A1 May 13, 2004

Related U.S. Application Data

(62) Division of application No. 09/465,852, filed on Dec. 17, 1999, now Pat. No. 6,624,099.

(51) Int. Cl.$^7$ ............................................. B29C 47/06
(52) U.S. Cl. ..................... 264/176.1; 264/248; 264/263; 264/280; 264/296; 264/257
(58) Field of Search .............................. 264/176.1, 296, 264/280, 248, 257, 263; 156/244.27, 308.2; 428/340, 336; 442/290

(56) References Cited

U.S. PATENT DOCUMENTS

| | | | |
|---|---|---|---|
| 3,437,550 A | 4/1969 | Paul ............................. 161/93 |
| 3,489,639 A | 1/1970 | Spencer ........................ 161/93 |
| 4,435,466 A | 3/1984 | Kuhnel et al. ............... 428/215 |
| 4,438,166 A | 3/1984 | Gluck et al. ................ 428/113 |
| 5,047,446 A | 9/1991 | DeNicola, Jr. .............. 522/157 |
| 5,047,485 A | 9/1991 | DeNicola, Jr. .............. 525/387 |
| 5,140,074 A | 8/1992 | DeNicola, Jr. et al. ..... 525/263 |
| 5,212,246 A | 5/1993 | Ogale ......................... 525/240 |
| 5,286,791 A | 2/1994 | DeNicola, Jr. et al. ....... 525/71 |
| 5,302,454 A | 4/1994 | Cecchin et al. ............. 428/402 |
| 5,312,669 A | 5/1994 | Bedard ........................ 428/105 |
| 5,324,753 A | 6/1994 | Lesca et al. .................. 521/79 |
| 5,409,992 A | 4/1995 | Eppert, Jr. .................... 525/88 |
| 5,411,994 A | 5/1995 | Galli et al. ................ 521/50.5 |
| 5,441,590 A | 8/1995 | Ihm et al. .................... 156/148 |
| 5,626,813 A * | 5/1997 | Murschall et al. .......... 264/469 |
| 5,674,342 A * | 10/1997 | Obijeski et al. ....... 156/244.11 |
| 5,811,185 A * | 9/1998 | Schreck et al. ............. 428/349 |
| 5,895,709 A | 4/1999 | Paul et al. ................... 442/263 |
| 6,624,099 B1 * | 9/2003 | Shah .......................... 442/290 |

OTHER PUBLICATIONS

J. H. Elliott, "A One–Point Intrinsic Viscosity Method for Polyethylene and Polypropylene;" *J. App. Poly. Sci.*, vol. 14, p. 2947–2963 (1970).

M. McConnell, "Polymer Molecular Weights and Molecular Weight Distributions By Low–Angle Laser Light Scattering;" *American Laboratory*, May (1978).

H. Munstedt, "New Universal Extensional Rheometer for Polymer Melts. Measurements on a Polystyrene Sample;" *Journal of Rheology*, 23(4) p. 421–436 (1979)—Figure 1.

Jean–Michel Charrier, Polymeric Materials and Processing 508 (Hanser Publishers 1990).

* cited by examiner

*Primary Examiner*—Mark Eashoo

(57) ABSTRACT

A process for making a multi-layer sheet comprising:
(1) extruding a sheet comprising a propylene polymer material;
(2) forming a sheet by laying-up alternate layers; and
(3) joining the sheets produced in steps (1) and (2) by applying heat to both sheets at a temperature sufficient to soften the surfaces to be joined, while simultaneously applying pressure to the sheet produced in step (1).

4 Claims, No Drawings

PROCESS FOR MAKING GLASS-REINFORCED MULTI-LAYER SHEETS FROM OLEFIN POLYMER MATERIALS

CROSS-REFERENCE TO RELATED APPLICATIONS

This is a divisional application of application Ser. No. 09/465,852 filed on Dec. 17, 1999 now U.S. Pat. No, 6,624,099. The entire contents of application Ser. No. 09/465,852 as filed are incorporated herein by reference.

FIELD OF THE INVENTION

This invention relates to multi-layer glass-reinforced sheets made from olefin polymer materials.

BACKGROUND OF THE INVENTION

Glass fiber mats have been used to reinforce various polyolefin materials. For example, U.S. Pat. No. 3,437,550 discloses the preparation of a laminate comprising a plurality of alternating plies of glass fabric and crystalline polypropylene film The glass fibers are coated with the reaction product of a silane and a crystalline polypropylene modified with an unsaturated acid or anhydride. U.S. Pat. No. 3,489,639 discloses a laminated structure comprising a sheet of polypropylene, a fabric including glass fibers and polypropylene fibers, and a layer of glass fibers embedded in a solid resin such as a polyester or epoxy resin. U.S. Pat. No. 4,435,466 discloses a multi-layered sealing sheet for the building industry comprising a glass textile reinforcing insert embedded between layers of elastomeric synthetic resin containing additives to enhance weatherability, and fillers to enhance the mechanical properties of the sheet, the outer layers being weldable thermally and/or by use of solvents or swelling agents.

U.S. Pat. No. 4,438,166 discloses a structural laminate useful for thermal insulation applications comprising a facing sheet adhered to a rigid foam layer in which is embedded a mat of long glass fibers arranged in layers, each layer being arranged parallel to the facing sheet, and a second facing sheet on the other side of the foam layer. The facing sheets are made from a flame resistant material such as asbestos, glass fibers, or metals. The foam-forming material can be, for example, polyurethane, polypropylene, or polyethylene.

U.S. Pat. No. 5,895,709 discloses a thermoformable multi-layer sheet product manufactured by pressure laminating one or more molten polymeric films such as polypropylene or polyester films, and superposed layers of glass cloth material such that the molten polymer impregnates the glass cloth layer. The core structure can be laminated on both sides with a neat polymer layer, i.e., one that is free of any reinforcing or non-reinforcing filler.

However, there is still a need for polymer sheet materials with a high flexural modulus as well as an aesthetically pleasing outer surface such as a high gloss layer or an embossed or textured layer.

SUMMARY OF THE INVENTION

The multi-layer sheet of the present invention comprises:
(1) at least one outer layer comprising a propylene polymer material selected from the group consisting of:
  (a) a propylene homopolymer or a copolymer of propylene and ethylene or a 4–8 C alpha-olefin, wherein the polymerized ethylene or polymerized alpha-olefin content of the copolymer is not greater than 20%, and, optionally, about 0.15% to about 0.70% of a nucleating agent,
  (b) a graft copolymer comprising a backbone of a propylene polymer material, having graft polymerized thereto polymerized monomers selected from the group consisting of (i) at least one acrylic monomer, (ii) at least one styrenic monomer, and (iii) mixtures of (i) and (ii), and, optionally, about 0.5% to about 1.5% of a nucleating agent, and
  (c) an olefin polymer composition comprising:
    (i) about 10 parts to about 60 parts by weight of a crystalline propylene homopolymer having an isotactic index greater than 80, or a crystalline copolymer from monomers selected from the group consisting of (1) propylene and ethylene, (2) propylene, ethylene and a $C_4$–$C_8$ α-olefin, and (3) propylene and a $C_4$–$C_8$ α-olefin, the copolymer having a polymerized propylene content of more than 85% by weight and an isotactic index greater than 85;
    (ii) about 5 parts to about 25 parts by weight of a copolymer of ethylene and propylene or a $C_4$–$C_8$ α-olefin that is insoluble in xylene at ambient temperature; and
    (iii) about 30 parts to about 70 parts by weight of an elastomeric copolymer from monomers selected from the group consisting of (1) ethylene and propylene, (2) ethylene, propylene, and a $C_4$–$C_8$ α-olefin, and (3) ethylene and a $C_4$–$C_8$ α-olefin, the copolymer optionally containing about 0.5% to about 10% by weight of a polymerized diene, and containing less than 70% by weight of polymerized ethylene and being soluble in xylene at ambient temperature and having an intrinsic viscosity measured in decahydro-naphthalene at 135° C. of about 1.5 to about 4.0 dl/g;
    the total of (ii) and (ii), based on the total olefin polymer composition being from about 50% to about 90%, and the weight ratio of (ii)/(iii) being less than 0.4, wherein the composition is prepared by polymerization in at least two stages and has a flexural modulus of less than 150 MPa,
(2) at least one layer comprising alternate layers of (a) a propylene polymer material selected from the group consisting of (i) a propylene homopolymer and (ii) a copolymer of propylene and ethylene or a 4–8 C alpha-olefin, wherein the polymerized ethylene or polymerized alpha-olefin content of the copolymer is not greater than 20%, wherein the melt flow rate of the propylene polymer material in layer (2) is higher than the melt flow rate of the propylene polymer material in layer (1), and (b) glass fiber mats having a weight/unit area of about 0.5 to about 4.5 oz/ft², with the propylene polymer material as the top and bottom layers,
wherein layer (1) has a thickness of about 0.001 inch to about 0.25 inch.

The process of this invention for making the multi-layer sheet of this invention comprises:
(1) extruding a sheet comprising a propylene polymer material selected from the group consisting of:
  (a) a propylene homopolymer or a copolymer of propylene and ethylene or a 4–8 C alpha-olefin, wherein the polymerized ethylene or polymerized alpha-olefin content of the copolymer is not greater than 20%, and, optionally, about 0.15% to about 0.70% of a nucleating agent,
  (b) a graft copolymer comprising a backbone of a propylene polymer material having graft polymerized thereto polymerized monomers selected from the group consisting of (i) at least one acrylic monomer, (ii) at least one styrenic monomer, and (iii) mixtures of (i) and (ii), and, optionally, about 0.5% to about 1.5% of a nucleating agent, and
(c) an olefin polymer composition comprising:
(i) about 10 parts to about 60 parts by weight of a crystalline propylene homopolymer having an isotactic index greater than 80, or a crystalline copolymer from monomers selected from the group consisting of (1) propylene and ethylene, (2) propylene, ethylene and a $C_4$–$C_8$ α-olefin, and (3) propylene and a $C_4$–$C_8$ α-olefin, the copolymer having a polymerized propylene content of more than 85% by weight and an isotactic index greater than 85;
(ii) about 5 parts to about 25 parts by weight of a copolymer of ethylene and propylene or a $C_4$–$C_8$ α-olefin that is insoluble in xylene at ambient temperature; and
(iii) about 30 parts to about 70 parts by weight of an elastomeric copolymer from monomers selected from the group consisting of (1) ethylene and propylene, (2) ethylene, propylene, and a $C_4$–$C_8$ α-olefin, and (3) ethylene and a $C_4$–$C_8$ α-olefin, the copolymer optionally containing about 0.5% to about 10% by weight of a polymerized diene, and containing less than 70% by weight of polymerized ethylene and being soluble in xylene at ambient temperature and having an intrinsic viscosity measured in decahydro-naphthalene at 135° C. of about 1.5 to about 4.0 dl/g;
the total of (ii) and (iii), based on the total olefin polymer composition being from about 50% to about 90%, and the weight ratio of (ii)/(iii) being less than 0.4, wherein the composition is prepared by polymerization in at least two stages and has a flexural modulus of less than 150 MPa;
the sheet of propylene polymer material having a thickness of about 0.001 to about 0.25 inch,
(2) forming a sheet by laying-up alternate layers of (a) a sheet of a propylene polymer material selected from the group consisting of (i) a propylene homopolymer and (ii) a copolymer of propylene and ethylene or a 4–8 C alpha-olefin, wherein the polymerized ethylene or polymerized alpha-olefin content of the copolymer is not greater than 20%, wherein the melt flow rate of the propylene polymer material in layer (2) is higher than the melt flow rate of the propylene polymer material in layer (1), and the sheet has a thickness of about 0.01 to about 0.1 inch, and (b) glass fiber mats having a weight per unit area of about 0.5 to about 4.5 oz/ft$^2$, that have been pre-heated to a temperature of about 140° to about 200° C., with the sheet of propylene material as the top and bottom layers, compressing the layers at a pressure of at least 300 psi, and then cooling while maintaining this pressure, and
(3) joining the sheets produced in steps (1) and (2) by applying heat to both sheets at a temperature sufficient to soften the surfaces to be joined, while simultaneously applying pressure to the sheet produced in step (1).

The multi-layer sheets of this invention have an aesthetically pleasing outer surface, a high flexural modulus, and are light in weight.

Composite materials comprising a central core material such as a polyolefin foam or a synthetic resin honeycomb material, sandwiched between two of the multi-layer sheets described above are another embodiment of this invention.

DETAILED DESCRIPTION OF THE INVENTION

The propylene polymer material that is used in outer layer (1) of the multi-layer sheet of this invention can be a propylene homopolymer or a copolymer of propylene and ethylene or a 4–8 C alpha-olefin, wherein the total amount of polymerized ethylene or polymerized alpha-olefin is not greater than 20%. Typically the ethylene content is about 1% to about 10%, preferably about 1% to about 5%. The alpha-olefin content is preferably less than 16%. The preferred alpha-olefin is butene-1.

The propylene polymer material that is used in outer layer (1) of the multi-layer sheet of this invention can also be a graft copolymer comprising a backbone of a propylene polymer material having graft polymerized thereto monomers selected from the group consisting of: (i) at least one acrylic monomer, (ii) at least one styrenic monomer, and (iii) mixtures of (i) and (ii). Acrylic monomers are preferred.

The propylene polymer material that is used as the backbone of the graft copolymer can be:
(1) a homopolymer of propylene having an isotactic index greater than 80, preferably about 85 to about 99;
(2) a copolymer of propylene and an olefin selected from the group consisting of ethylene and 4–10 C alpha-olefins, provided that when the olefin is ethylene, the maximum polymerized ethylene content is about 10%, preferably about 4%, and when the olefin is a 4–10 C alpha-olefin, the maximum polymerized content thereof is about 20% by weight, preferably about 16%, the copolymer having an isotactic index greater than 85;
(3) a terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;
(4) an olefin polymer composition comprising:
(a) about 10% to about 60% by weight, preferably about 15% to about 55%, of a propylene homopolymer having an isotactic index greater than 80, preferably about 85 to about 98, or a copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight, preferably about 90% to about 99%, and an isotactic index greater than 85;
(b) about 5% to about 25% by weight, preferably about 5% to about 20%, of a copolymer of ethylene and propylene or a 4–8 C alpha-olefin that is insoluble in xylene at ambient temperature; and
(c) about 30% to about 70% by weight, preferably about 40% to about 65%, of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight, preferably about 10% to about 60%, most preferably about 12% to about 55%, of polymerized ethylene and being soluble in xylene at ambient temperature and having an intrinsic viscosity, measured in decahydronaphthalene at 135° C., of about 1.5 to about 4.0 dl/g,
wherein the total amount of (b) and (c), based on the total olefin polymer composition, is about 50% to about 90%, the weight ratio of (b)/(c) is less than 0.4, preferably 0.1 to 0.3, and the composition is prepared by polymerization in at least two stages and has a flexural modulus of less than 150 MPa; or (5) a thermoplastic olefin comprising:
   (a) about 10% to about 60%, preferably about 20% to about 50%, of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;
   (b) about 20% to about 60%, preferably about 30% to about 50%, of an amorphous copolymer from monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and
   (c) about 3% to about 40%, preferably about 10% to about 20%, of a copolymer of ethylene and propylene or a 4–8 C alpha-olefin that is insoluble in xylene at ambient temperature,
wherein the thermoplastic olefin has a flexural modulus of greater than 150 but less than 1200 MPa, preferably about 200 to about 1100 MPa, and most preferably about 200 to about 1000 MPa.

Room or ambient temperature is ~25° C.

The 4–8 C alpha-olefins useful in the preparation of (4) and (5) include, for example, butene-1, pentene-1; hexene-1; 4-methyl-1-pentene, and octene-1.

The diene, when present, is typically a butadiene; 1,4-hexadiene; 1,5-hexadiene, or ethylidenenorbornene.

Propylene polymer materials (4) and (5) can be prepared by polymerization in at least two stages, where in the first stage the propylene; propylene and ethylene; propylene and an alpha-olefin, or propylene, ethylene and an alpha-olefin are polymerized to form component (a) of (4) or (5), and in the following stages the mixtures of ethylene and propylene; ethylene and the alpha-olefin, or ethylene, propylene and the alpha-olefin, and optionally a diene, are polymerized in the presence of (a) to form components (b) and (c) of (4) or (5).

The polymerization can be conducted in liquid phase, gas phase, or liquid-gas phase using separate reactors, all of which can be done either by batch or continuously. For example, it is possible to carry out the polymerization of component (a) using liquid propylene as a diluent, and the polymerization of components (b) and (c) in gas phase, without intermediate stages except for the partial degassing of the propylene. All gas phase is the preferred method.

The preparation of propylene polymer material (4) is described in more detail in U.S. Pat. Nos. 5,212,246 and 5,409,992, which are incorporated herein by reference. The preparation of propylene polymer material (5) is described in more detail in U.S. Pat. Nos. 5,302,454 and 5,409,992, which are incorporated herein by reference.

Propylene homopolymer is the preferred propylene polymer backbone material.

The acrylic monomers that can be graft polymerized onto the propylene polymer material backbone include, for example, acrylic acid; acrylate esters, such as the methyl, ethyl, hydroxyethyl, 2-ethylhexyl, and butyl acrylate esters; methacrylic acid, and methacrylate esters such as the methyl, ethyl, butyl, benzyl, phenylethyl, phenoxyethyl, epoxypropyl, hydroxypropyl methacrylate esters, and mixtures thereof.

The styrenic monomers that can be graft polymerized onto the propylene polymer material backbone include styrene and alkyl or alkoxy ring-substituted styrenes where the alkyl or alkoxy group is a 1–4 C linear or branched alkyl or alkoxy group, and mixtures thereof.

When a mixture of acrylic and styrenic monomers is used, the ratio of acrylic to styrenic monomers can be about 95/5 to about 5/95.

The polymerized monomers comprise about 10 to about 120 parts per hundred parts of the propylene polymer material, preferably about 30 to about 95 pph.

During the graft polymerization, the monomers also polymerize to form a certain amount of free or ungrafted polymer. The morphology of the graft copolymer is such that the propylene polymer material is a continuous or matrix phase, and the polymerized monomer, both grafted and ungrafted, is a dispersed phase.

The graft copolymer can be made according to any one of various methods. One of these methods involves forming active grafting sites on the propylene polymer material by treatment with a peroxide or other chemical compound that is a free radical polymerization initiator, or by irradiation with high energy ionizing radiation. The free radicals produced on the polymer as a result of the chemical or irradiation treatment form the active grafting sites on the polymer and initiate the polymerization of the monomers at these sites. Graft copolymers produced by peroxide-initiated grafting methods are preferred.

Preparation of graft copolymers by contacting the polypropylene with a free radical polymerization initiator such as an organic peroxide and a vinyl monomer is described in more detail in U.S. Pat. No. 5,140,074, which is incorporated herein by reference. Preparation of graft copolymers by irradiating an olefin polymer and then treating with a vinyl monomer is described in more detail in U.S. Pat. No. 5,411,994, which is incorporated herein by reference.

When the propylene polymer material in layer (1) is a graft copolymer, the composition can also contain about 2% to about 30%, preferably about 5% to about 30%, based on the total weight of the composition, of one or more rubber components, and/or about 15% to about 50%, preferably about 40% to about 50%, based on the total weight of the composition, of a broad molecular weight distribution propylene polymer material.

The rubber component is selected from one or more of the group consisting of (i) an olefin copolymer rubber, (u) a monoalkenyl aromatic hydrocarbon-conjugated diene block copolymer, and (iii) a core-shell rubber. Any of these rubber components can have acid or anhydride functionality or can be free of these functional groups. The preferred rubber components are (i) or (ii), either alone or in combination.

Suitable olefin copolymer rubbers include, for example, saturated olefin copolymer rubbers such as ethylene/propylene monomer rubbers (EPM), ethylene/octene-1, and ethylene/butene-1 rubbers, and unsaturated olefin copolymer rubbers such as ethylene/propylene/diene monomer rubbers (EPDM). The preferred olefin copolymer rubbers are ethylene/propylene, ethylene/butene-1, and ethylene/octene-1 copolymers.

The monoalkenyl aromatic hydrocarbon-conjugated diene block copolymer can be a thermoplastic elastomer of the A-B (or diblock) structure, the linear A-B-A (or triblock) structure, the radial $(A-B)_n$ type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the rid and end blocks, and the ratio of monoalkenyl aromatic hydrocarbon to rubber. The block copolymer can also be hydrogenated. Typical monoalkenyl aromatic hydrocarbon monomers are styrene, ring-substituted 1–4 C linear or branched alkyl styrenes, and vinyltoluene. Styrene is preferred. Suitable conjugated dienes include, for example, butadiene and isoprene. Preferred block copolymers are hydrogenated styrene/ethylene-butene-1/styrene triblock copolymers.

The weight average molecular weight ($M_w$) of the block copolymers generally will be in the range of about 45,000 to about 260,000 g/mole, average molecular weights in the range of about 50,000 to about 125,000 g/mole being preferred on the basis that they produce compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of a crosslinked rubber phase surrounded by a compatibilizing shell, normally a glassy polymer or copolymer. The core is typically a diene rubber such as butadiene or isoprene rubber, or a polyacrylate. The shell is typically a polymer of two or more monomers selected from styrene, methyl nethacrylate, and acrylonitrile. Particularly preferred core-shell rubbers have a polyacrylate core.

Suitable impact modifiers include, for example, Engage 8150 or Engage 8200 ethylene/octene-1 copolymers commercially available from DuPont-Dow Elastomers; EPM 306P ethylene/propylene copolymer, commercially available from the Polysar Rubber Division of Miles, Incorporated; and Kraton RP6912 styrene/ethylene-propylene/styrene triblock copolymer rubber and Kraton FG 1901X styrene/ethylene-butene-1/styrene triblock copolymer rubber modified with maleic anhydride, commercially available from Shell Chemical Company.

Another optional ingredient is a broad molecular weight distribution propylene polymer material (BMWD PP) having a $M_w/M_n$ of about 5 to about 60, preferably about 5 to about 40; a melt flow rate of about 0.5 to about 50, preferably about 1 to about 30 g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD PP can be prepared by sequential polymerization in at least two stages, in the presence of a Ziegler-Natta catalyst supported on magnesium halide in active form. The polymerization process occurs in separate and consecutive stages, and in each stage polymerization takes place in the presence of the polymer and the catalyst from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD PP is described in more detail in U.S. Pat. No. 5,286,791, which is incorporated herein by reference.

When the propylene polymer material in layer (1) is a propylene homopolymer or copolymer, the nucleating agent, when present, is typically used in an amount of about 0.15% to about 0.70%, preferably about 0.2% to about 0.4%. When the propylene polymer material in layer (1) is a graft copolymer, the nucleating agent, when present, is typically used in an amount of about 0.5% to about 1.5%, preferably about 0.7% to about 1.3%. Suitable optional nucleating agents include, for example, bis(3,4-diethylbenzylidene) sorbitol; sodium benzoate; dibenzylidene sorbitol; 1,3:2,4-methyldibenzylidene sorbitol; NAl1, a sodium salt of a phosphoric ester, commercially available from Ashai Denka, and NC-4, bis(P-ethylbenzylidene) sorbitol, commercially available from Mitsui Chemicals.

The propylene polymer material in layer (1) can also be an olefin polymer composition comprising:
  (a) about 10 parts to about 60 parts by weight, preferably about 15 parts to about 55 parts, of a crystalline propylene homopolymer having an isotactic index greater than 80, preferably about 85 to about 98, or a crystalline copolymer from monomers selected from the group consisting of (i) propylene and ethylene, (ii) propylene, ethylene and a $C_4$–$C_8$ α-olefin, and (iii) propylene and a $C_4$–$C_8$ α-olefin, the copolymer having a polymerized propylene content of more than 85% by weight, preferably about 90% to about 99%, and an isotactic index greater than 85;
  (b) about 5 parts to about 25 parts by weight, preferably about 5 parts to about 20 parts, of a copolymer of ethylene and propylene or a $C_4$–$C_8$ α-olefin that is insoluble in xylene at ambient temperature; and
  (c) about 30 parts to about 70 parts by weight, preferably about 20 parts to about 65 parts, of an elastomeric copolymer from monomers selected from the group consisting of (i) ethylene and propylene, (ii) ethylene, propylene, and a $C_4$–$C_8$ α-olefin, and (iii) ethylene and a $C_4$–$C_8$ α-olefin, the copolymer optionally containing about 0.5% to about 10% by weight of a polymerized diene, and containing less than 70% by weight, preferably about 10% to about 60%, most preferably about 12% to about 55%, of polymerized ethylene and being soluble in xylene at ambient temperature and having an intrinsic viscosity measured in decahydronaphthalene at 135° C. of about 1.5 to about 4.0 dl/g;
the total of (b) and (c), based on the total olefin polymer composition being from about 50% to about 90%, and the weight ratio of (b)/(c) being less than 0.4, preferably 0.1 to 0.3, wherein the composition is prepared by polymerization in at least two stages and has a flexural modulus of less than 150 MPa.

The total amount of polymerized ethylene in (c) is preferably about 10% to about 40% by weight.

The $C_4$–$C_8$ α-olefins useful in the preparation of (c) include, for example, butene-1; pentene-1; hexene-1; 4-methyl-1-pentene, and octene-1.

The diene, when present, is typically a butadiene; 1,4-hexadiene; 1,5-hexadiene, or ethylidenenorbornene.

Room or ambient temperature is ~25° C.

The olefin polymer composition can be prepared by polymerization in at least two stages, where in the first stage the propylene, or propylene and ethylene or α-olefin, or propylene, ethylene and the α-olefin are polymerized to form component (a), and in the following stages the mixtures of ethylene and propylene or the α-olefin, or ethylene, propylene and the α-olefin, and optionally a diene, are polymerized to form components (b) and (c).

The polymerization can be conducted in liquid phase, gas phase, or liquid-gas phase using separate reactors, all of which can be done either by batch or continuously. For example, it is possible to carry out the polymerization of component (a) using liquid propylene as a diluent, and the polymerization of components (b) and (c) in gas phase, without intermediate stages except for the partial degassing of the propylene. An all gas phase process is the preferred method.

The preparation of the olefin polymer composition is described in more detail in U.S. Pat. Nos. 5,212,246 and 5,409,992, which are incorporated herein by reference.

Additives such as pigments, metallic flake, slip agents, waxes, oils, antiblocking agents, and antioxidants can also be present in the composition used to form layer (I) of the multi-layer sheet of this invention.

The thickness of layer (1) is about 0.001 inches to about 0.25 inches, preferably about 0.02 inches to about 0.06 inches.

The melt flow rate (MFR) of the propylene polymer material in layer (1) is typically about 0.5 to about 7 g/10 min, preferably less than 5 g/10 min, measured according to ASTMr method D-1238 at 230° C. and 2.16 kg.

Layer (2) of the multi-layer sheet of this invention comprises alternate layers of a propylene polymer material and glass fiber mats, with the propylene polymer material as the top and bottom layers.

The propylene polymer material is selected from the group consisting of (i) a propylene homopolymer and (ii) a copolymer of propylene and ethylene or a 4–8 C alpha-olefin, wherein the polymerized ethylene or polymerized alpha-olefin content of the copolymer is not greater than 20%. Propylene homopolymer is preferred. The melt flow rate of the propylene polymer material in layer (2) is higher than the melt flow rate of the propylene polymer material in layer (1).

The glass fiber mats can be single layer or multi-layer mats. The fibers in the mats are not limited to any particular orientation. The weight per unit area of the mats is within the range of about 0.5 to about 4.5 oz/ft$^2$, preferably about 1.0 to about 3.5 oz/ft$^2$.

A coupling agent can also be used in layer (2). The coupling agent can be, for example, polypropylene modified with an $\alpha,\beta$-unsaturated carboxylic acid or alicyclic carboxylic acid and derivatives thereof, such as, for example, acrylic acid, methacrylic acid, maleic acid, fumaric acid, itaconic acid, endocyclo(2,2,1)-5-heptene-2,3-carboxylic acid, and cis-4-cyclohexene-1,2-carboxylic acid and anhydrides, esters, amides, and imides thereof. Polypropylenes modified with various amounts of maleic anhydride or maleic acid are preferred and are available commercially, for example, from Eastman Chemical Company and Aristech Chemicals. The modified polypropylenes generally contain about 0.5% to about 10% of maleic acid or maleic anhydride, preferably about 0.5% to about 5%, based on the total weight of the modified polymer. When present, the coupling agent is used in an amount of about 0.5% to about 7%, preferably about 1% to about 5%, based on the total weight of the polymer in layer (2).

Any number of sheets of propylene polymer material and glass mats can be used for laying-up layer (2), provided that a sheet of propylene polymer material is always the top and the bottom layer. Preferably there are not more than five layers of propylene polymer material and three layers of glass mat. The thickness of layer (2) depends upon the use for which the multi-layer sheet is intended.

The process for making the multi-layer sheets of this invention comprises:

(1) extruding a sheet comprising a propylene polymer material selected from the group consisting of:

(a) a propylene homopolymer or a copolymer of propylene and ethylene or a 4–8 C alpha-olefin, wherein the polymerized ethylene or polymerized alpha-olefin content of the copolymer is not greater than 20%, and, optionally, about 0.15% to about 0.70%, preferably about 0.2% to about 0.4%, of a nucleating agent, (b) a graft copolymer comprising a backbone of a propylene polymer material, having graft polymerized thereto polymerized monomers selected from the group consisting of (i) at least one acrylic monomer, (ii) at least one styrenic monomer, and (iii) mixtures of (i) and (ii), and, optionally, about 0.5% to about 1.5%, preferably about 0.7% to about 1.3%, of a nucleating agent, and (c) an olefin polymer composition comprising:

(i) about 10 parts to about 60 parts by weight, preferably about 15 parts to about 55 parts, of a crystalline propylene homopolymer having an isotactic index greater than 80, preferably about 85 to about 98, or a crystalline copolymer from monomers selected from the group consisting of (1) propylene and ethylene, (2) propylene, ethylene and a $C_4$–$C_8$ $\alpha$-olefin, and (3) propylene and a $C_4$–$C_8$ $\alpha$-olefin, the copolymer having a polymerized propylene content of more than 85% by weight, preferably about 90% to about 99%, and an isotactic index greater than 85;

(ii) about 5 parts to about 25 parts by weight, preferably about 5 parts to about 20 parts, of a copolymer of ethylene and propylene or a $C_4$–$C_8$ $\alpha$-olefin that is insoluble in xylene at ambient temperature; and (iii) about 30 parts to about 70 parts by weight, preferably about 20 parts to about 65 parts, of an elastomeric copolymer from monomers selected from the group consisting of (1) ethylene and propylene, (2) ethylene, propylene, and a $C_4$–$C_8$ $\alpha$-olefin, and (3) ethylene and a $C_4$–$C_8$ $\alpha$-olefin, the copolymer optionally containing about 0.5% to about 10% by weight of a polymerized diene, and containing less than 70% by weight, preferably about 10% to about 60%, most preferably about 12% to about 55%, of polymerized ethylene and being soluble in xylene at ambient temperature and having an intrinsic viscosity measured in decahydronaphthalene at 135° C. of about 1.5 to about 4.0 dl/g;

the total of (ii) and (iii), based on the total olefin polymer composition being from about 50% to about 90%, and the weight ratio of (ii)/(iii) being less than 0.4, preferably 0.1 to 0.3, wherein the composition is prepared by polymerization in at least two stages and has a flexural modulus of less than 150 MPa, the sheet of propylene polymer material having a thickness of about 0.001 to about 0.25 inch, preferably about 0.02 to about 0.06 inch, (2) forming a sheet by laying-up alternate layers of (a) a sheet of a propylene polymer material selected from the group consisting of (i) a propylene homopolymer and (ii) a copolymer of propylene and ethylene or a 4–8 C alpha-olefin, wherein the polymerized ethylene or polymerized alpha-olefin content of the copolymer is not greater than 20%, the melt flow rate of the propylene polymer material in layer (2) is higher than the melt flow rate of the propylene polymer material in layer (1), and the sheet has a thickness of about 0.01 to about 0.1 inch, preferably about 0.02 to about 0.06 inch, and (b) glass fiber mats having a weight per unit area of about 0.5 to about 4.5 oz/ft$^2$, preferably about 1.0 to about 3.5 oz/ft$^2$, that have been preheated to a temperature of about 140° to about 200° C., preferably about 160° to about 185° C., with the sheet of propylene polymer material as the top and bottom layers, compressing the layers at a pressure of at least 300 psi preferably about 500 to about 750 psi, and then cooling while maintaining this pressure, and (3) joining the sheets produced in steps (1) and (2) by applying heat to both sheets at a temperature sufficient to soften the surfaces to be joined, while simultaneously applying pressure to the sheet produced in step (1).

In step (3), heat can be applied to the surfaces of the sheets made in steps (1) and (2) using, for example, superheated air from a hot air gun, a technique similar to that used for heat welding two layers of plastic sheeting in the roofing and geomembrane industries. Pressure can be applied to the sheet made by step (1), for example, by the use of a rubber roller. The pressure applied depends upon the total thickness of the structure and the temperature to which the two sheets are preheated. Higher pressures are required for thicker structures. Wide multi-layer sheets can be made in a continuous fashion by preheating the surfaces to be joined in ovens and then passing the sheets through a continuous feed laminating roll stack.

The multi-layer sheets of this invention exhibit a combination of a flexural modulus of at least 1,000,000 psi (6,897 MPa) and an aesthetically pleasing outer surface such as, for example, a high gloss layer or an embossed or textured layer.

The multi-layer sheets are used in flat sheet form for applications such as body panels for recreational and transportation vehicles such as trucks, buses, and all-terrain vehicles; marine components, and sanitary ware such as tubs and shower stalls.

Another embodiment of this invention is a composite material comprising a core material such as, for example, a synthetic resin honeycomb material or a layer of a low density polyolefin form sandwiched between two of the multi-layer sheets described above.

A suitable low density polyolefin foam has a density of about 1 to about 15 lb/ft$^3$ and a thickness of about ⅛ inch to about 4 inches, preferably >1 inch up to 3 inches. The low density foam layer can be an extruded foam sheet or plank, or the layer can be molded from foam beads. The low density foam layer can comprise a single thickness of foam, or several thin layers attached to each other, e.g., thermally, such as by the use of a "hot knife", or by the use of a suitable adhesive such as, for example, low molecular weight polyolefins made from functionalized unsaturated monomers with polar groups such as monounsaturated carboxylic acids or their anhydride derivatives such as maleic or itaconic acid or their anhydrides, or unfunctionalized unsaturated monomers; hot melt adhesives, or aqueous- or solvent-based emulsions. Suitable bonding agents include, for example, hydrogenated hydrocarbon resins such as Regalrez tackifiers, commercially available from Hercules Incorporated, and Arkon P tackifiers, commercially available from Arakawa Chemical (U.S.A.) Incorporated; 1023PL amorphous polypropylene tackifying agent available from Eastman Chemical Company, and predominantly amorphous ethylene/propylene copolymers commonly known as ethylene/propylene rubber (EPR).

The foam layer and the multi-layer sheets are formed separately and then joined, for example, either thermally or by the use of a suitable adhesive such as those described in the preceding paragraph.

The polyolefin used to make the foam is preferably a high melt strength propylene polymer having strain hardening elongational viscosity. The high melt strength propylene polymer is preferably a normally solid, high molecular weight, gel-free, predominantly isotactic, semi-crystalline propylene homopolymer, or a copolymer of propylene and ethylene or a 4–10 C alpha-olefin, provided that when the olefin is ethylene, the maximum polymerized ethylene content is 5%, preferably about 4%, by weight, and when the olefin is a 4–10 C alpha-olefin, the maximum polymerized content thereof is about 20%, preferably about 16%, by weight. The branching index of the propylene homopolymer and copolymer is less than 1, and both have strain hardening elongational viscosity.

The branching index quantifies the degree of long chain branching. In preferred embodiments the branching index of the high melt strength propylene polymer is preferably less than about 0.9, and most preferably about 0.3 to 0.5. It is defined by the equation:

$$g' = \frac{[IV]_{Br}}{[IV]_{Lin}}\bigg|_{M_w}$$

in which g' is the branching index, $[IV]_{Br}$ is the intrinsic viscosity of the branched propylene polymer material, and $[IV]_{Lin}$ is the intrinsic viscosity of a normally solid, predominantly isotactic, semi-crystalline, linear propylene polymer material of substantially the same weight average molecular weight, and, in the case of copolymers, substantially the same relative molecular proportion of monomer units.

Intrinsic viscosity, also known as the limiting viscosity number, in its most general sense is a measure of the capacity of a polymer molecule to enhance the viscosity of a solution. This depends on both the size and the shape of the dissolved polymer molecule. In comparing a non-linear polymer with a linear polymer of substantially the same weight average molecular weight, the intrinsic viscosity is an indication of the configuration of the non-linear polymer molecule. The above ratio of intrinsic viscosities is a measure of the degree of branching of the non-linear polymer. A method for determining the intrinsic viscosity of propylene polymer materials is described by Elliott et al., J. App. Poly. Sci., 14, 2947–2963 (1970). The intrinsic viscosity is determined with the polymer dissolved in decahydronaphthalene at 135° C.

Weight average molecular weight can be measured by various procedures. However, the procedure preferably used here is that of low angle laser light scattering photometry, which is disclosed by McConnell in Am. Lab., May 1978, in the article entitled "Polymer Molecular Weights and Molecular Weight Distribution by Low-Angle Laser Light Scattering".

Elongational viscosity is the resistance of a fluid or semi-fluid substance to elongation. It is a melt property of a thermoplastic material that can be determined by an instrument that measures the stress and strain of a specimen in the melt state when subjected to tensile strain at a constant rate. One such instrument is described and shown in FIG. 1 of Munstedt, J. Rheology, 23, (4), 421–425 (1979). A commercial instrument of similar design is the Rheometrics RER-9000 extensional rheometer. Molten, high molecular weight, linear propylene polymer material exhibits elongational viscosity which, as it is elongated or drawn at a constant rate from a relatively fixed point, tends to increase for a distance dependent on the rate of elongation, and then to decrease rapidly until it thins to nothing, so-called ductile or necking failure. On the other hand, a molten propylene polymer material that is of substantially the same weight average molecular weight and at substantially the same test temperature as the corresponding molten, high molecular weight, linear, propylene polymer material, exhibits elongational viscosity which, as it is elongated or drawn from a relatively fixed point at substantially the same rate of elongation tends to increase over a longer distance, and to break or fail by fracture, so-called brittle or elastic failure. These characteristics are indicative of strain hardening. The more long chain branching the propylene polymer material of this invention has, the greater the tendency of the elongational viscosity to increase as the elongated material approaches failure. This latter tendency is most evident when the branching index is less than about 0.8.

The high melt strength polymers can be made by treating a normally solid, predominantly crystalline propylene polymer without strain hardening elongational viscosity with a low decomposition temperature peroxide or with high energy ionizing radiation in the substantial absence of atmospheric oxygen, for example, in an environment in which an active oxygen concentration of less than about 15% by volume is maintained. The peroxide-treated or irradiated propylene polymer is then heated or treated with a free radical scavenger in the substantial absence of atmospheric oxygen to deactivate substantially all of the free radicals present in the propylene polymer.

The preparation of the high melt strength propylene polymers having strain hardening elongational viscosity is described in more detail in U.S. Pat. Nos. 5,047,446 and 5,047,485, which are incorporated herein by reference.

Alternatively, the high melt strength propylene polymer can be characterized by at least (a) either a $M_z$ of at least $1.0 \times 10^6$ or a $M_z/M_w$ ratio of at least 3.0, and (b) either an equilibrium compliance $J_{eo}$ of at least $12 \times 10^{-5}$ cm$^2$/dyne or a recoverable shear strain per unit stress Sr/S of at least $5 \times 10^{-5}$ cm$^2$/dyne at 1 sec$^{-1}$.

The molecular weight distribution in a sample of the propylene polymer material can be determined by high temperature gel permeation chromatography (GPC). The Waters 150 CV GPC chromatograph can be used at 135° C. with trichlorobenzene as the carrier solvent and a set of Waters μ-Styragel HT, $10^3$, $10^4$, $10^5$ and $10^6$ columns. The solution concentration is 0.2% (w/v) and the flow rate is 1 ml/min.

The rheological characterization of the propylene polymer materials can be conducted with a programmed Rheometrics mechanical spectrometer (RMS-800). Resin pellets are compression molded into sheets from which samples are stamped out with a 25 mm diameter circular die. Tests are conducted at 210±1° C. using 25 m parallel plate geometry with a 1.4 mm gap. Creep data are obtained under a constant stress of 1000 dyne/cm$^2$ for a period of 0–300 sec. The creep compliance J(t) is given by $$J(t)=\tau(t)/\sigma_o=J_{eo}+t/\eta_o$$

where τ=strain $\sigma_o$=stress $J_{eo}$=equilibrium compliance $\eta_o$=zero shear viscosity The equilibrium compliance $J_{eo}$ is a measure of melt elasticity and is determined by first plotting strain against time at constant stress. The strain as a function of time is divided by the stress to give J(t). $J_{eo}$ is the intercept of the J(t) against time plot.

The recoverable shear strain per unit stress Sr/S also distinguishes the high melt strength propylene polymer materials. This quantity is a fundamental measure of melt elasticity. Using the programmed Rheometrics mechanical spectrometer, the polymer melt is subjected to clockwise rotational shear strain by the driver and the resulting shear stress S and first normal stress $N_1$ are measured by a transducer. The shear rate range is 0.01 to 10 s$^{-1}$, the tire before measurement is 2.2 min and the time of the measurement is 0.3 min. Normal stress measurements are obtained at each shear rate. The recoverable shear strain Sr is obtained from the first normal stress difference $N_1$.

$$Sr = \frac{N_1}{2S}$$

The normalized quantity Sr/S, i.e., recoverable shear strain per unit stress is a measure of melt elasticity.

Extruded foam sheets can be made by conventional techniques such as, for example, using a tandem extrusion line. The process consists of mixing the propylene polymer having a high melt strength and high melt elasticity with a nucleating agent in a primary extruder, kneading the mixture, injecting a physical blowing agent into the mixture to form a foaming mixture, transferring the foaming mixture to a secondary extruder, mixing and cooling the foaming mixture, and extruding the foaming mixture through an annular or flat die into a continuous foam sheet. Suitable nucleating agents include a mixture of citric acid and sodium bicarbonate, talc, and titanium dioxide. Suitable blowing agents include hydrocarbons such as butane and isopentane, chlorinated hydrocarbons, chlorofluorocarbons, nitrogen, carbon dioxide, and other inert gases.

Low density foam layers molded from foam beads can be made, for example, by making preformed beads by extruding a high melt strength propylene polymer in the presence of a foaming agent such as, for example, pentane, hexane, dichlorotrifluoroethane and methylene chloride. One or more nucleating agents such as talc, colloidal silica, sodium bicarbonate or its blends with citric acid, and azodicarbonamide, can be added to the polymer before or during extrusion. The preformed beads are then thermoformed by sintering. A mold having the desired dimensions is filled with the preformed beads and the beads are heated by passing a hot pressurized gas such as superheated steam through the mold to obtain sintering and produce the finished article. Such a process is described, for example, in U.S. Pat. No. 5,324,753, which is incorporated herein by reference.

If a synthetic resin honeycomb material is used as the central core layer, the surfaces of the honeycomb material to be joined to the multi-layer sheets are first cleaned of all loose dirt and debris. One side of the honeycomb material is then heated, typically for a time period of about 30 seconds, while simultaneously heating one of the multi-layer sheets, typically for about three minutes, at a hot plate temperature of 230° C. The heated sides of the honeycomb material and the multi-layer sheet are pressed against each other with a hydraulic press. The heating and compression steps are then repeated to laminate the second multi-layer sheet to the other side of the honeycomb material.

Isotactic index is defined as the percent of olefin polymer insoluble in xylene. The weight percent of olefin polymer soluble in xylene at room temperature is determined by dissolving 2.5 g of the polymer in 250 ml of xylene at room temperature in a vessel equipped with a stirrer, and heating at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Intrinsic viscosity is measured in decahydronaphthalene at 135° C.

The melt flow rate of propylene polymer materials was measured according to ASTM method D-1238 at 230° C. using a weight of 2.16 kg.

In this specification, all parts and percentages are by weight unless otherwise noted.

EXAMPLE 1 AND COMPARATIVE EXAMPLE 1

This example describes the production of the multi-layer sheet of this invention. A comparison is made of the flexural modulus of the sheet of this invention and that of a commercially available sheet material comprising multiple layers of glass mat embedded in a synthetic resin.

The composition of the top layer of the sheet in Example 1 is given in Table 1. The samples were compounded on a 40 mm co-rotating, intermeshing twin screw Werner & Pfleiderer ZSK extruder.

TABLE 1

| | Wt. % |
|---|---|
| Visbroken PP | 97.88 |
| LC2OFF antioxidant | 0.2 |
| Pationic 1240 Ca salt | 0.05 |
| Tinuvin 328 antioxidant | 0.29 |
| Tinuvin 770 antioxidant | 0.24 |
| Chimassorb 119 antioxidant | 0.24 |
| Millad 3988 nucleator | 0.25 |
| Ca stearate | 0.1 |
| TiO$_2$ | 0.75 |

The visbroken polypropylene (PP) was obtained by passing a mixture comprising (a) 100 parts of a propylene homopolymer having a melt flow rate (MFR) of 0.4 dg/min and commercially available from Montell USA Inc., (b) 0.10 pph Irgafos 168 tris (2,4-di-tert-butylphenyl) phosphate antioxidant, (c) 0.10 pph Irganox 1010 tetrakis[methylene-(3,5-di-tert-butyl-4-hydroxyhydrocinnamate)]methane antioxidant, and (d) an amount of Lupersol 101 2,5-dimethyl-2,5(t-butylperoxy)hexane, commercially available from Elf Atochem, sufficient to produce a MFR of 2.5 dg/min (0.067 g/lb of resin) through a 3.5" single screw with a mixing head. Both antioxidants are commercially available from Ciba Specialty Chemicals Company.

LC20FF antioxidant is a blend in free-flowing form of 50% Irganox 1010 antioxidant and 50% Irgafos 12 antioxidant, which is 2,2',2"-nitrilo triethyl-tris[3,3',5,5'-tetra-tert-butyl-1,1'-biphenyl-2,2'-diyl] phosphite, commercially available from Ciba Specialty Chemicals Company. Pationic 1240 is a modified calcium salt derived from lactic acid and is commercially available from Patco Polymer Additives Division of American Ingredients Company. Tinuvin 328 2-(2-hydroxy-3,5-ti-tertiaryamylphenyl)-2H-benzotriazole antioxidant; Tinuvin 770 bis(2,2,6,6-tetramethyl-4-piperidinyl) sebacate antioxidant, and Chimassorb 119 antioxidant are all commercially available from Ciba Specialty Chemicals Company. Millad 3988 bis(3,4-dimethylbenzylidene) sorbitol nucleating agent is commercially available from Milliken Chemical Company and has a melting point of 275° C. The additives package was added as a 5% concentrate in a carrier comprising a propylene homopolymer having a MFR of 12 dg/min and a solubility in xylene at room temperature of 4%, commercially available from Montell USA Inc.

The second layer of the multi-layer sheet in Example 1 was prepared by laying-up three layers of 0.04" thick propylene homopolymer sheet and two layers of E-Glass mat, with the polypropylene sheet as the first, third, and fifth layers. The propylene homopolymer had a MFR of 5 dg/min and is commercially available from Montell USA Inc. The glass mats were made from unidirectional glass fibers and random fibers, had a weight per unit area of 3.3 oz/ft$^2$, and are commercially available from PPG Industries.

The alternate layers of polypropylene sheet and E-Glass mat were then compression molded in a hot hydraulic press under the following conditions:
(a) preheating the glass mats and the polypropylene sheets at 180° C. for 10 minutes in a molding press;
(b) subjecting the structure to a pressure of about 700 psi at a temperature of 180° to 190° C. for 10 minutes;
(c) cooling down the structure in the closed press.

The nucleated polypropylene sheet was joined to the glass-reinforced sheet by applying superheated air from a hot air gun at the surfaces to be joined. Pressure was simultaneously applied to the nucleated polypropylene sheet using a rubber roller.

The gloss of the nucleated polypropylene sheet was measured with a gloss meter at a 60° angle and was >60.

The multi-layer sheet prepared as described above was compared with a laminate of polypropylene reinforced with continuous strand glass fiber, designated as PH 10420 and commercially available from Azdel Inc. The commercial material is designated as The gloss of the nucleated polypropylene sheet was measured with a gloss meter at a 60° angle and was >60.

The multi-layer sheet prepared as described above was compared with a laminate of polypropylene reinforced with continuous strand glass fiber, designated as PH10420 and commercially available from Azdel, Inc. The commercial material is designated as Comparative Example 1 in Table 2. Flexural modulus was measured according to ASTM D-790-86. The results are given in Table 2.

TABLE 2

| | Ex. 1 | Comp. Ex. 1 |
|---|---|---|
| Thickness (mm) | 2.0 | 3.75 |
| Density (g/cm$^3$) | 1.3 | 1.2 |
| Flexural modulus (MPa) | 19,000 | 10,000 |

EXAMPLE 2

This example describes the preparation of a composite material comprising a synthetic resin honeycomb material sandwiched between two layers of the multi-layer sheet of this invention.

Two nucleated polypropylene sheets and two sheets made from alternate layers of propylene homopolymer and glass fiber mat were prepared as described in Example 1.

The honeycomb material was Tubulam, a predominantly polypropylene material commercially available from Airex Corporation. The material had the following properties: cell diameter—0.33"; thickness—1.0"; weight per unit area—0.53 lb/ft$^2$; shear yield strength—1160 psi; shear modulus—58 psi; compression strength perpendicular to the plane—159 psi; compressive modulus perpendicular to the plane—15,080 psi.

Before bonding the glass-reinforced sheets to the honeycomb material, all of the bonding surfaces were cleaned of all loose debris and dirt. One side of the honeycomb material was heated for 30 seconds and one glass-reinforced sheet was heated for three minutes at 230° C. hot plate temperature. Heat was applied to both structures at the same time. The heated sides of the honeycomb and the glass-reinforced sheet were compressed against each other with a hydraulic press under a nominal pressure of 15 psi for five minutes. These steps were repeated to laminate the second glass-reinforced sheet to the other side of the honeycomb. A reduction of the honeycomb thickness of about 0.08" was observed during the compression steps.

A nucleated polypropylene sheet was joined to the glass-reinforced sheet on one side of the honeycomb material by applying superheated air from a hot air gun to the surfaces to be joined. Pressure was simultaneously applied to the nucleated polypropylene sheet using a rubber roller. The process was repeated to join the second polypropylene sheet to the glass-reinforced sheet on the other side of the honeycomb material.

The properties of the composite structure are given in Table 3 below.

EXAMPLE 3

This example describes the preparation of a composite material comprising a polyolefin foam sandwiched between two layers of the multi-layer sheet of this invention.

Two multi-layer sheets comprising a top layer of nucleated polypropylene and a second layer of alternating layers of polypropylene and glass fiber mat were prepared as described in Example 1.

The polyolefin foam was in the form of an extruded sheet having a thickness of 1.25" made from a propylene homopolymer having strain hardening elongational viscosity. The foam had a modulus of 222 Kpsi and a density of 11 lb/ft$^3$ and is commercially available from Nomaco Inc.

The multi-layer sheets and the foam core were bonded with Hi-Strength 90 adhesive, commercially available from Minnesota Mining and Manufacturing Company. All surfaces to be joined were first cleaned by wiping with acetone. The adhesive was sprayed on both of the surfaces to be joined according to the manufacturer's instructions. Most of the glass fibers in the second layer of the multi-layer sheet face was the same direction. It is therefore desirable that the glass fibers in each of the multi-layer sheets are aligned in the same direction when the multi-layer sheets are joined to the foam core. The composite with a multi-layer sheet on both sides of the foam core was then clamped between two steel plates and the adhesive was allowed to cure for 24 hours.

A composite structure prepared as described above that is 18" long, 2" wide and 1.25" thick was supported at its ends and a 50 lb load was applied at the exact center of the beam at room temperature. Total deflection (in) was measured using ASTM method C-393 for cored structures. As a comparison, deflection values were measured for a composite structure having a honeycomb core and prepared as described in Example 2. Total deflection values were also calculated for a composite with a foam core having a modulus of 400 Kpsi, commercially available from Nomaco Inc., using the equations given in ASTM method C-393, and for a steel beam having a modulus of 20 Mpsi, and an aluminum beam having a modulus of 8 Mpsi using the equations given in ASTM method D-790 for single layer structures. The results are given in Table 3.

TABLE 3

| | Total Deflection (in) | Wt./Unit Area (lb/ft$^3$) | Total thickness (in) |
|---|---|---|---|
| Composite with honeycomb core | 0.096 | 2.34 | 1.25 |
| Composite with foam core (modulus = 222 Kpsi) | 0.039 | 3.0 | 1.25 |
| Composite with foam core (modulus = 400 Kpsi) (calculated) | 0.027 | 3.5 | 1.25 |
| Steel beam (calculated) | 0.027 | 14.59 | 0.36 |
| Aluminum beam (calculated) | 0.27 | 7.76 | 0.55 |

The data show that the structures of this invention provide the same resistance to load as the steel and aluminum beams even though they are much lighter in weight.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A process for making a multi-layer sheet comprising:
   (1) extruding a sheet comprising a propylene polymer material selected from the group consisting of:
      (a) a propylene polymer selected from (i) a propylene homopolymer, (ii) a copolymer of propylene and ethylene, and (iii) a copolymer of propylene and a 4–8 C alpha-olefin, wherein the polymerized ethylene or polymerized alpha-olefin content of the copolymer is not greater than 20%, and, optionally about 0.15% to about 0.70% of a nucleating agent,
      (b) a graft copolymer comprising a backbone of a propylene polymer material, having graft polymerized thereto polymerized monomers selected from the group consisting of (i) at least one acrylic monomer, (ii) at least one styrenic monomer, and (iii) mixtures of (i) and (ii), and, optionally, about 0.5% to about 1.5% of a nucleating agent, and
      (c) an olefin polymer composition comprising:
         (i) about 10 parts to about 60 parts by weight of a crystalline propylene homopolymer having an isotactic index greater than 80, or a crystalline copolymer from monomers selected from the group consisting of (1) propylene and ethylene, (2) propylene, ethylene and a $C_4$–$C_8$ α-olefin, and (3) propylene and a $C_4$–$C_8$ α-olefin, the copolymer having a polymerized propylene content of more than 85% by weight and an isotactic index greater than 85;
         (ii) about 5 parts to about 25 parts by weight of a copolymer of ethylene and propylene or a $C_4$–$C_8$ α-olefin that is insoluble in xylene at ambient temperature; and
         (iii) about 30 parts to about 70 parts by weight of an elastomeric copolymer from monomers selected from the group consisting of (1) ethylene and propylene, (2) ethylene, propylene, and a $C_4$–$C_8$ α-olefin, and (3) ethylene and a $C_4$–$C_8$ α-olefin, the copolymer optionally containing about 0.5% to about 10% by weight of a polymerized diene, and containing less than 70% by weight of polymerized ethylene and being soluble in xylene at ambient temperature and having an intrinsic viscosity measured in decahydro-naphthalene at 135° C. of about 1.5 to about 4.0 dl/g;
         the total of (ii) and (iii), based on the total olefin polymer composition being from about 50% to about 90%, and the weight ratio of (ii)/(iii) being less than 0.4, wherein the composition is prepared by polymerization in at least two stages and has a flexural modulus of less than 150 MPa;
   the sheet of propylene polymer material having a thickness of about 0.001 inch to about 0.25 inch,
   (2) forming a sheet by laying-up alternate layers of (a) a sheet of a propylene polymer material selected from the group consisting of (i) a propylene homopolymer, (ii) a copolymer of propylene and ethylene, and (iii) a copolymer of propylene and a 4–8 C alpha-olefin, wherein the polymerized ethylene or polymerized alpha-olefin content of the copolymer is not greater than 20%, the melt flow rate of the propylene polymer material in layer (2) is higher than the melt flow rate of the propylene polymer material in layer (1), and the sheet has a thickness of about 0.01 to about 0.1 inch, arid (b) glass fiber mats having a weight per unit area of about 0.5 to about 4.5 oz/ft$^2$, that have been preheated to a temperature of about 140° to about 200° C., with the sheet of propylene polymer material as the top and bottom layers, compressing the layers at a pressure of at least 300 psi, and then cooling while maintaining this pressure, and (3) joining the sheets produced in steps (1) and (2) by applying heat to both sheets at a temperature sufficient to soften the surfaces to be joined, while simultaneously applying pressure to the sheet produced in step (1).

2. The process of claim 1 wherein the polymerized monomers in the graft copolymer (b) of layer (1) are a mixture of methyl methacrylate and methyl acrylate.

3. The process of claim 1 wherein the propylene polymer material that is the backbone polymer of the graft copolymer (b) in layer (1) is selected from the group consisting of:

(a) a homopolymer of propylene having an isotactic index greater than 80;

(b) a copolymer of propylene and an olefin selected from the group consisting of ethylene and 4–10 C alpha-olefins, provided that when the olefin is ethylene, the maximum polymerized ethylene content is about 10% and when the olefin is a 4–10 C alpha-olefin, the maximum polymerized content thereof is about 20% by weight, the copolymer having an isotactic index greater than 85;

(c) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(d) an olefin polymer composition comprising:
 (i) about 10% to about 60% by weight of a propylene homopolymer having an isotactic index greater than 80, or a copolymer of monomers selected from the group consisting of (1) propylene and ethylene, (2) propylene, ethylene and a 4–8 C alpha-olefin, and (3) propylene and a 4–8 C alpha-olefin, the copolymer having a polymerized propylene content of more than 85% by weight and an isotactic index greater than 85;
 (ii) about 5% to about 25% by weight of a copolymer of ethylene and propylene or a 4–8 C alpha-olefin that is insoluble in xylene at ambient temperature; and
 (iii) about 30% to about 70% by weight of an elastomeric copolymer of monomers selected from the group consisting of (1) ethylene and propylene, (2) ethylene, propylene, and a 4–8 C alpha-olefin, and (3) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity measured in decahydronaphthalene at 135° C. of about 1.5 to about 4.0 dl/g, wherein the total amount of (ii) and (iii), based on the total olefin polymer composition, is about 50% to about 90%, the weight ratio of (ii)/(iii) is less than 0.4, and the composition is prepared by polymerization in at least two stages and has a flexural modulus of less than 150 MPa; and (e) a thermoplastic olefin comprising:
 (i) about 10% to about 60% of a propylene homopolymer having an isotactic index greater than 80, or a copolymer of monomers selected from the group consisting of (1) ethylene and propylene, (2) ethylene, propylene and a 4–8 C alpha-olefin, and (3) ethylene and a 4–8 C alpha-olefin, the copolymer having a polymerized propylene content greater than 85% and an isotactic index of greater than 85;
 (ii) about 20% to about 60% of an amorphous copolymer from monomers selected from the group consisting of (1) ethylene and propylene, (2) ethylene, propylene, and a 4–8 C alpha-olefin, and (3) ethylene and a 4–8 C alpha-olefin, the copolymer optionally containing about 0.5% to about 10% of a polymerized diene, and containing less than 70% polymerized ethylene and being soluble in xylene at ambient temperature; and (iii) about 3% to about 40% of a copolymer of ethylene and propylene or a 4–8 alpha-olefin that is insoluble in xylene at ambient temperature, while the thermoplastic olefin has a flexural modulus of greater than 150 but less than 1200 MPa.

4. The process of claim 3 wherein the propylene polymer material is a propylene homopolymer.

* * * * *